United States Patent [19]

Newell

[11] 4,092,568
[45] May 30, 1978

[54] INTERPOLATING STEPPING MOTOR SYSTEM

[75] Inventor: Harold R. Newell, South Newbury, N.H.

[73] Assignee: Mesur-Matic Electronics Corporation, Salem, Mass.

[21] Appl. No.: 657,989

[22] Filed: Feb. 13, 1976

Related U.S. Application Data

[63] Continuation-in-part of Ser. No. 465,596, Apr. 30, 1974, Pat. No. 3,961,232.

[51] Int. Cl.² ............................................. H02P 5/46
[52] U.S. Cl. .................................... 318/46; 318/685; 318/696
[58] Field of Search ................... 318/46, 45, 138, 254, 318/685, 696

[56] References Cited

U.S. PATENT DOCUMENTS

3,961,232   6/1976   Newell ................................... 318/46

*Primary Examiner*—Herman J. Hohauser
*Attorney, Agent, or Firm*—Pollock, Vande Sande & Priddy

[57] ABSTRACT

A driven load is advanced to a selected position by the rotor of a large angle step motor, the housing of which is driven by a small angle step motor having a stationary housing. Driving pulses are fed to the plural phase windings associated with the large angle step motor under control of digital logic, by means of a slip ring assembly. Driving pulses are also fed to the plural phase windings of the small angle step motor under control of the same digital logic.

31 Claims, 10 Drawing Figures

INTERPOLATING STEPPING MOTOR SYSTEM

RELATED APPLICATION

This application is a continuation-in-part of my prior co-pending application Ser. No. 465,596, filed Apr. 30, 1974, now U.S. Pat. No. 3,961,232 issued Jun. 1, 1976. The disclosure of that application is incorporated herein by reference.

BACKGROUND OF THE INVENTION

This invention relates to the drive of loads such as those associated with machine tools, by a step motor system, and includes certain improvements over the system disclosed in my said prior co-pending application, Ser. No. 465,596.

Stepped movement of a load to an interpolated position intermediate between the steps attainable by a large angle step motor may be attained by use of a small angle step motor in combination with a large angle step motor as disclosed in my prior co-pending application. However, in my prior co-pending application, the disclosed system had certain limitations overcome by the present invention. Because the housing of one step motor is driven by the other step motor, facilities were provided in the invention disclosed in Ser. No. 465,596, for limiting the amount of movement of one of the step motors to avoid wrap-up of the leads through which the driving pulses are fed to its field windings. This complicates the drive logic for the motors. It is therefore an object of the present invention to overcome the aforesaid disadvantages and problems of my prior step motor system, by feeding drive pulses via slip rings to that step motor which has the rotating housing.

SUMMARY OF THE INVENTION

In accordance with the present invention, a slip-ring and brush assembly is provided to transmit driving pulses to the stator mounted phase windings of a large angle step motor, the housing of which may be driven without reversal by a small angle step motor for interpolated positioning of a load connected to the rotor of the large angle step motor. In order to avoid inaccuracies during acceleration and deceleration, the pulse rate of the driving pulses energizing the phase windings is varied so as to decelerate the motors from a maximum permissible operating speed to a lower speed as the selected position of the load is being approached. Toward that end, the frequency of an oscillator in the digital logic is controlled. The logic, in turn, controls the motors by generating the driving pulses fed to the phase windings of the step motors. The pulse rate of the oscillator is increased after it has started supplying driving pulses and then decreased when the input count stored in one of the counters of the digital logic is reduced below a predetermined value as the driving pulses are delivered to the phase windings.

Reliable delivery of preselected numbers of driving pulses to the two step motors is assured by pulse supply logic through which the counts in a plural stage counter and a single stage counter are reduced toward zero and from which driving pulse paths extend to logic drivers transmitting energizing pulses to the phase windings. Flip-flops in the driver for the large angle step motor control energization of four phase windings through transistor switching in accordance with the logic state of a directional control line and the driving pulses fed to the driver along one path. Bi-directional shift registers in the driver for the small angle step motor control energization of eight phase windings through transistor switching in accordance with forward and reverse driving pulses.

DETAILED DESCRIPTION OF A PREFERRED EMBODIMENT

Figure 1:
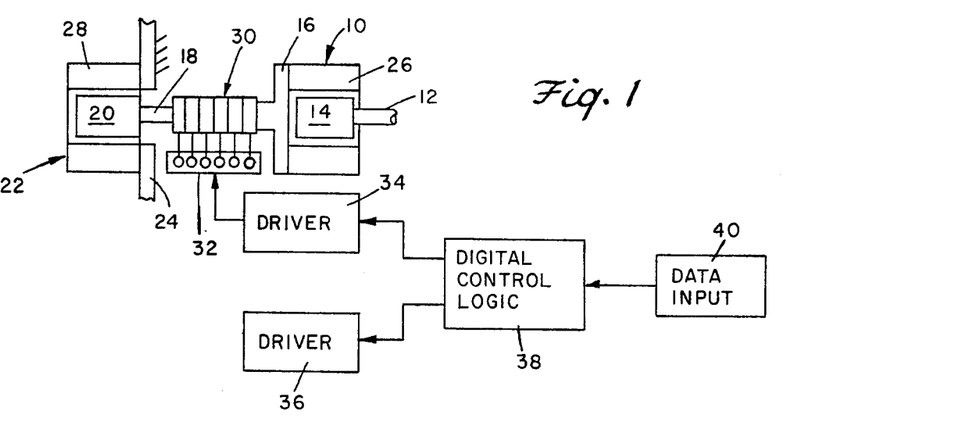
FIG. 1 is schematic illustration of the general arrangement of the present invention.

Referring now to the drawings, FIG. 1 illustrates the general arrangement of the present invention in a somewhat schematic fashion. A relatively large angle step motor 10 of the permanent magnet or variable reluctance type is utilized to position a load connected to the shaft 12 extending from its rotor 14. In order to interpolate between the step positions to which the load is advanced by motor 10, the housing 16 of motor 10 is driven by the output shaft 18 connected to the rotor 20 of a small angle step motor 22 as in the case of the arrangement disclosed in my prior co-pending application, Ser. No. 465,596, aforementioned. The housing 23 of the small angle step motor is stationary. A small angle step motor of the type disclosed, for example, in my prior U.S. Pat. Nos. 3,530,318 and 3,644,764, may be utilized. The step motors are respectively advanced at the same time by energization of the phase winding assemblies 26 and 28 respectively carried by the housings 16 and 24.

Unlike the arrangement disclosed in my prior co-pending application, aforementioned, unlimited rotation of the housing 16 of the step motor 10 in either direction is permitted by use of a slip-ring assembly 30 rotatable with the housing 16 and brush assembly 32 through which energizing pulses are fed to the phase windings from driver 34. Driving pulses are fed to the driver 34 as well as driver 36 for the phase winding assembly 28 from a control logic 38 in accordance with position commands received from a data input source 40.

In one embodiment of the invention, the large angle step motor 10 will drive a load in relatively large angle steps of 1.8° while the housing of the large angle step motor 10 is being advanced by the small angle step motor 22 in relatively small angle steps of one-tenth of the large angle step or 0.18°. Accordingly, the load will be advanced to a position between the large angle steps within the time it takes the large angle step motor to drive the load to the last large angle step preceding its selected interpolated position. Positioning of the load with the resolution of the small angle step motor is thereby accomplished about 10 times as fast as is possible with a small angle step motor alone or a large angle step motor with reduction gearing. Drive of the load through the large angle steps is effected through energizing pulses fed to a winding assembly 26 having four phases. The winding assembly 28, on the other hand, is provided with eight phases in the embodiment to be described.

Figure 2:
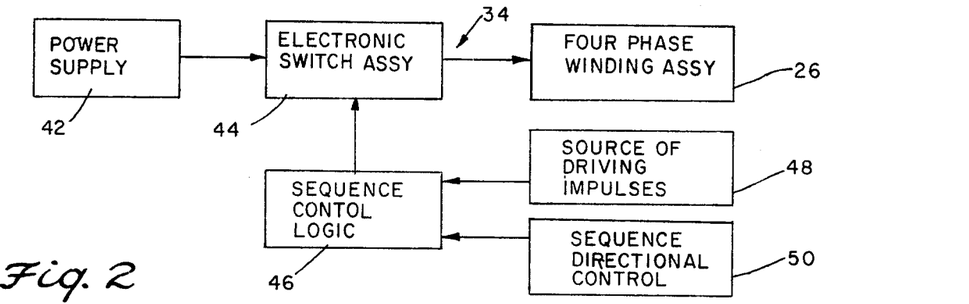
FIG. 2 is a block diagram depicting the driver for the large angle step motor shown in FIG. 1.

As shown in FIG. 2, which diagrammatically illustrates the driver component for the large angle step motor 10, the four phase winding assembly 26 for the step motor 10 is supplied with pulses from an electronic switch assembly 44 which is energized by power supply 42. Sequence control logic 46 operates the switch assembly 44 in accordance with driving pulses from source 48 and a control voltage from directional control 50 to control energization of the four phase windings of the step motor 10 in the correct sequence.

Figure 3:
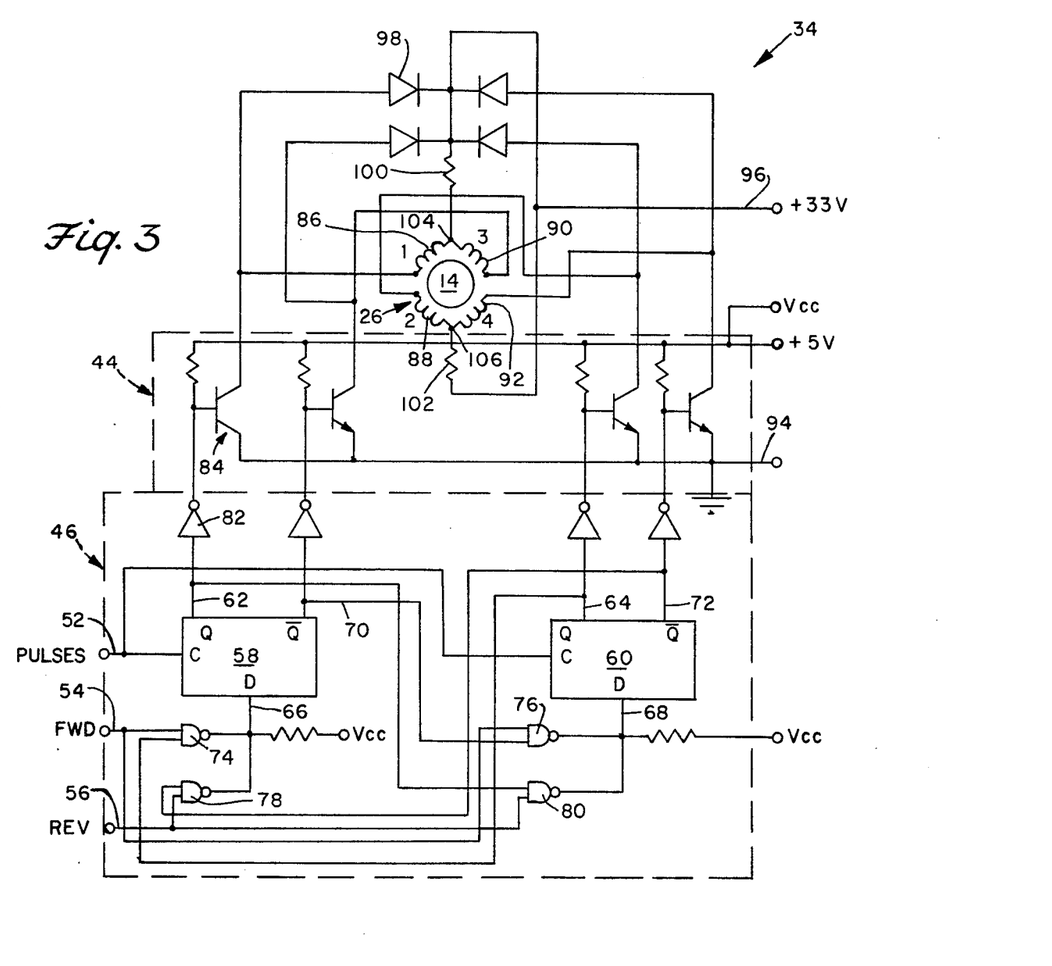
FIG. 3 is a circuit diagram of the large angle driver corresponding to FIG. 2.

FIG. 3 illustrates the circuits of sequence control logic 46, electronic switch assembly 44 and the four phase winding assembly 26 shown in block form in FIG. 2. The source of driving impulses 48 and sequence directional control 50 are actually contained in the digital control logic 38 and will be explained in more detail hereinafter. As shown in FIG. 3, drive pulses enter the driver 34 from the control logic 38 (see FIG. 1) on input line 52. Signal voltage from the control logic 38 is also received on forward control line 54 and reverse control line 56. When a positive voltage is applied to the forward line 54 with the reverse control line 56 remaining in its low logic state, the rotor 14 is driven or stepped in a forward direction. The rotor is driven in a reverse direction when conditions on the directional control lines 54 and 56 are reversed.

The input pulse line 52 is connected to the C inputs of flip-flops 58 and 60 having Q outputs 62 and 64 that assume the condition of the D input when C goes high. Any change at the D inputs 66 and 68 occurring before or after the C inputs go high, has no effect on the outputs Q or $\bar{Q}$ 70 and 72 of the flip-flops. The forward control line 54 is connected to one of the inputs of Nand gates 74 and 76 respectively connected to the D inputs 66 and 68 of the flip-flops. The other input of Nand gate 74 is connected to the Q output 64 of flip-flop 60 while the other input of Nand gate 76 is connected to the $\bar{Q}$ output 62 of flip-flop 58. The reverse control line 56 is connected to inputs of the second Nand gates 78 and 80 respectively connected in parallel with Nand gates 74 and 76 to the D inputs 66 and 68 of the flip-flops. The second input of Nand gate 78 is connected to $\bar{Q}$ of the flip-flop 60, and the second input of Nand gate 80 to the Q output of flip-flop 58. The four outputs of flip-flops 58 and 60 are respectively connected by inverters to the bases of NPN transistors 84 through which the motor phase windings 86, 88, 90 and 92 are switched on. The emitters of the transistors are connected to the negative common line 94 while the collectors are respectively connected to the phase windings of the motor 10, but are separated from the 33 volt positive energizing voltage line 96 by connection to the cathode of diodes 98. The energizing voltage line 96 is directly connected by current limiting resistors 100 and 102 to the common phase points 104 and 106 for the phase windings, and these resistances are so selected that only 3 volts appear across an activated motor phase winding when the motor is stopped. When a phase winding is switched on, the resistors 100 and 102 cause the power supply to act as a constant current source to overcome the effect of the delay in current rise in the phase winding resulting from its inductance. The current and motor torque is thereby maintained high during the rapid stepping action of the motor. When a phase winding is switched off by its associated transistor, the decay of its magnetic field produces a reverse voltage spike blocked by an associated diode 98 to prevent damage to the transistor.

With input line 52 in an initially low logic state, we can assume both $\bar{Q}$ outputs 70 and 72 of the flip-flops are high and both Q outputs 62 and 64 are low. In this condition two of the transistors 84 are rendered conductive to energize the first and second phase windings 86 and 88 of the motor. Assuming forward line 54 is high and reverse line 56 is correspondingly low, the D input 66 of flip-flop 58 is then high because the inputs of each Nand gate 74 and 78 are at different states. The D input 68 of flip-flop 60, on the other hand, is low because the inputs of each Nand gate 76 and 80 are at the same state. When a first positive driving pulse is applied to input line 52, the C inputs of both flip-flops go high so that the Q output 62 of flip-flop 58 assumes the high condition of its D input 66 thereby reversing the conditions of the Q and $\bar{Q}$ outputs 62 and 70 of flip-flop 58 to correspondingly switch the first phase winding 86 off and switch the third phase winding 90 on. Since the $\bar{Q}$ output 70 goes low and is connected to one of the inputs of Nand gate 76, this Nand gate switches the D input 68 of flip-flop 60 to high after the driving pulse is applied to its C input so that there is no change in the condition of the Q and $\bar{Q}$ outputs of the flip-flop 60 and the second phase winding 88 remains energized while the fourth phase winding 92 remains deenergized. The second positive pulse in the input line 52 does, however, change only the state of flip-flop 60 by causing its Q output 64 to assume the high condition of its D input 68. The second phase winding 88 is thus deenergized while the fourth phase winding 92 is energized. The foregoing alternate reversal of the output conditions of the flip-flops is repeated with each driving pulse to produce the correct switching sequence. By reversing the conditions in the directional control lines 54 and 56, a reverse sequence of logic switching occurs. The foregoing logic sequences are in accordance with the switching format disclosed, for example, in my prior U.S. Pat. No. 3,530,347. Thus we have demonstrated how a sequence of pulses to driver 34 sequentially energized the windings of motor 10 and how the directional control lines 54 and 56 control the direction of sequential energization.

Figure 4:
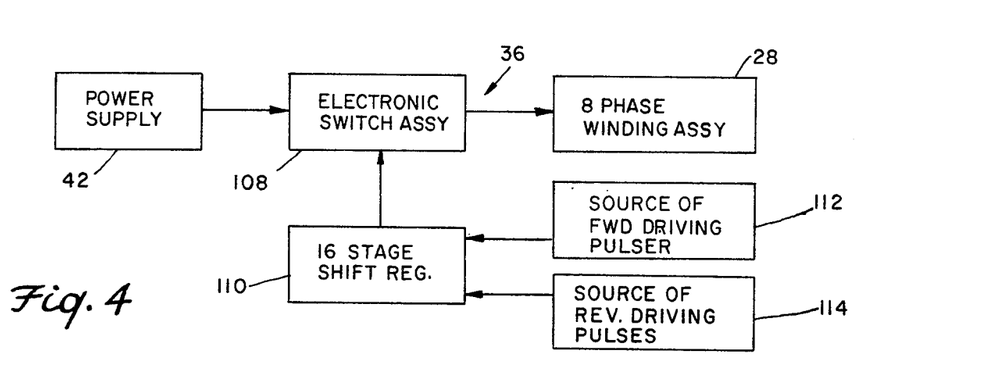
FIG. 4 is a block diagram depicting the driver for the small angle step motor shown in FIG. 1.

FIG. 4 diagrammatically illustrates the small angle driver 36 through which pulses derived from power supply 42 are fed in a predetermined switching sequence to the 8 phase winding assembly 28 under control of a switching assembly 108. A 16-stage shift register circuit 110 operates the switching assembly in response to either a source of forward driving pulses 112 or a source of reverse driving pulses 114. The switching sequence format is shown in the chart of FIG. 6.

Figures 5, 6:
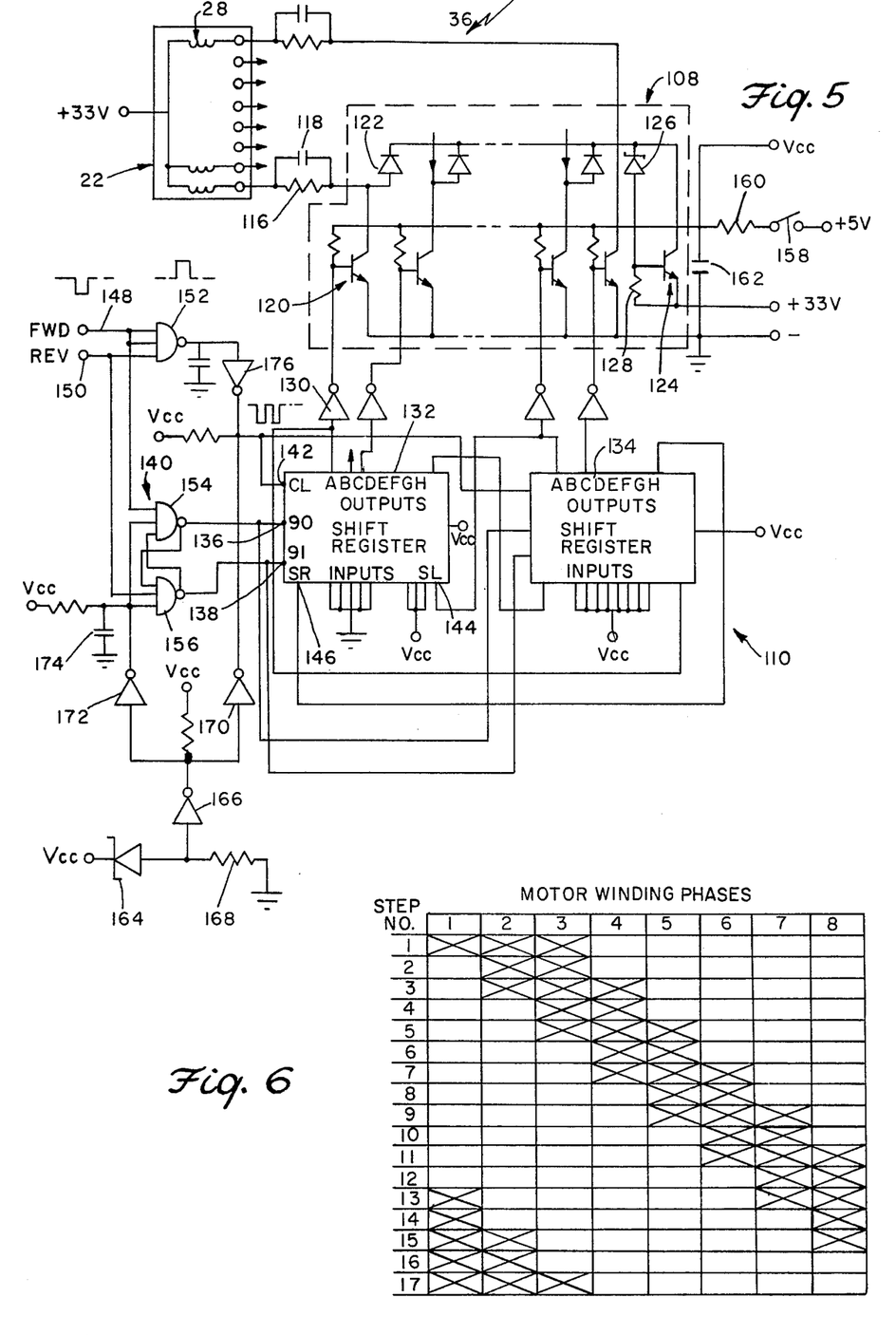
FIG. 5 is a circuit diagram of the small angle driver corresponding to FIG. 4.
FIG. 6 is a switching format chart for the phase windings of the small angle step motor.

FIG. 5 shows circuits for the electronic switch assembly 108, the eight-phase winding assembly 28 and the 16-stage shift register 110. As will become clear hereinafter, the sources of forward and reverse driving pulses 112 and 114 can be considered digital logic 38, which will be explained in more detail hereinafter.

As shown in FIG. 5, the 8-phase step motor 22 includes 8-phase windings 28 connected in common to a 33 volt source. Each winding is connected to the switching assembly 108 through a resistor 116 paralleled by a capacitor 118 to improve the time constant and cause mmore rapid build-up of the associated magnetic fields at the high switching rate for higher motor torque. Flow of energizing current through each phase winding is controlled by an associated switching transistor 120 in the switch assembly 108. To limit the reverse voltage spike produced when each phase winding it switched off by its transistor, each collector is connected by a diode 122 to the collector of transistor 124, the emitter of which is connected to the 33 volt source. The base of transistor 124 is connected to the anode of zener diode 126 and resistor 128 with the zener diode 126 connected between collector and base of transistor 124 and resistor 128 connected between base and emitter. The foregoing combination of zener diode, resistor and transistor placed in series with diodes 122 across the motor phase windings prevents damage to the switching transistors 120 by providing a by-pass for reverse spikes. The transistors 120 are switched on by positive going pulses applied to their bases by the shift register circuit 110.

The base of each of the 8 switching transistors 120 is connected by an inverter 130 to alternate output terminals A, C, E and G of two interconnected, 8-stage shift registers 132 and 134 adapted to shift either right or left under control terminals 136 and 138. Such shift registers may be 74198 which is available from a variety of manufacturers. Terminals 136 and 138 of both registers are connected to different output terminals of latch 140 for directional control. Data applied to the input of the registers is made available to the respective output terminals as controlled by the logic state of input control terminals 142 connected in parallel. In register module 132, inputs A, B, C, D and E are grounded so as to sequentially transfer low logic states to A, B, C, D and E outputs, while the other outputs (F, G and H) are connected to the operating voltage source Vcc to transfer high states to F, G and H outputs. The A output of each module is interconnected with the left shift terminal 144 of the other module so as to transfer its state to the H output of the other module during shift in a left direction. The H output of each module is interconnected with the right shift terminal 146 of the other module so as to transfer its state to the A output of the other module during shift in a right hand direction. In module 134, the inputs are all connected to the operating voltage source so as to transfer high logic states to the A, B, C, D, E, F and G outputs. The inverters 130 thus feed pulses from the A, C, E and G (e.g., the alternate outputs) outputs of each register module. The low-going output pulses are effective to energize the associated winding since the inverters produce corresponding high outputs.

Pulses for driving the shift registers in either direction are received at terminals 148 and 150 connected to the inputs of Nand gate 152 and to the enabling inputs of Nand gates 154 and 156 of the latch 140. Operating voltage derived from the 5 volt source upon closing of switch 158 as shown in FIG. 5, reaches an effective level of 4 volts, for example, after a delay of 1 millisecond, for example, determined by resistor 160 and capacitor 162 to render zener diode 164 sufficiently conductive to allow normal powering of all logic elements. The inverter 166 held low by grounded resistor 168 is thus raised to the high state so that inverter 170 connected in series therewith switches the input control terminals 142 of the registers from the low to the high states in order to initiate transfer of data to the register outputs. The rise in voltage controlled by zener diode 164 is also operative through inverters 166 and 172 connected in series, to enable the Nand gates 154 and 156 after a delay determined by capacitor 174. When enabled, one or the other of the Nand gates 154 and 156 will switch its output from a high to a low state depending on which of the terminals 148 and 150 receives a negative going driving pulse. The outputs of the Nand gates 154 and 156 being connected to terminals 136 and 138 of the registers thus determine the direction of shift after the registers have been conditioned as discussed above. Subsequent pulses passed by Nand gate 152 and inverter 176 to the input control terminals 142, cause shift of the registers to produce the switching format charted in FIG. 6. More particularly, before the first shift pulse is received the outputs A, B, C, D and E of register 132 are low and all other outputs of registers 132 and 134 are high. Thus the inverters 130 corresponding to outputs A, C and E of register 132 produce high outputs energizing their associated windings 1, 2 and 3 (see FIG. 6). All other windings are de-energized. After a right shift, for instance, outputs B, C, D, E and F of register 132 are low and all others are high. Thus the windings corresponding to outputs C and E only are energized, e.g., windings 2 and 3 (see FIG. 6). With this explanation the reader can verify the energization of the windings as illustrated in FIG. 6.

Thus we have explained how a pulse train applied to one of the input terminals 148 or 150 sequentially energizes the windings of motor 22 and how the direction of the sequence can be controlled.

Figure 7:
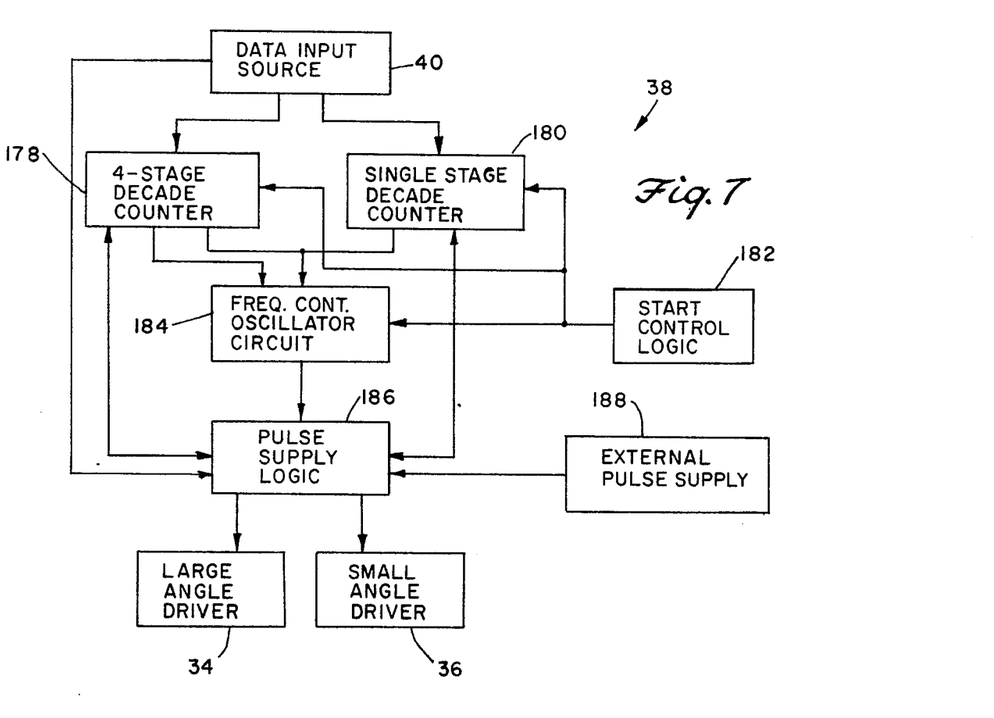
FIG. 7 is a block diagram depicting the digital control logic included in FIG. 1.

FIG. 7 is a block diagram of the digital control logic 38 and the manner in which it is connected to a data source 40 and to the drivers 34 and 36. Input drive pulses for the motor system are derived from the data input source 40 which may be in the form of punched paper tape, magnetic tape or a computer. The input data is fed to a 4-stage decade counter 178 and a single stage decade counter 180 that are triggered into operation by signals from a start control logic 182 which also initiates operation of a frequency controlled oscillator 184 to which the counters are connected. The 4-stage counter receives input data so as to control the supply of pulses fed by the pulse supply logic 186 to the large angle driver 34, whereas the single stage counter 180 receives input data so as to control the supply of pulses fed to the small angle driver 36. As pulse supply logic 186 supplies pulses to driver 34 or 36, it decrements the count in the corresponding counter 178 or 180. Pulses may, alternatively, be supplied from an external source 188 connected to the pulse supply logic 186. A logic level, derived from data source 40, determines direction and is supplied to pulse supply logic 186.

Figure 8:
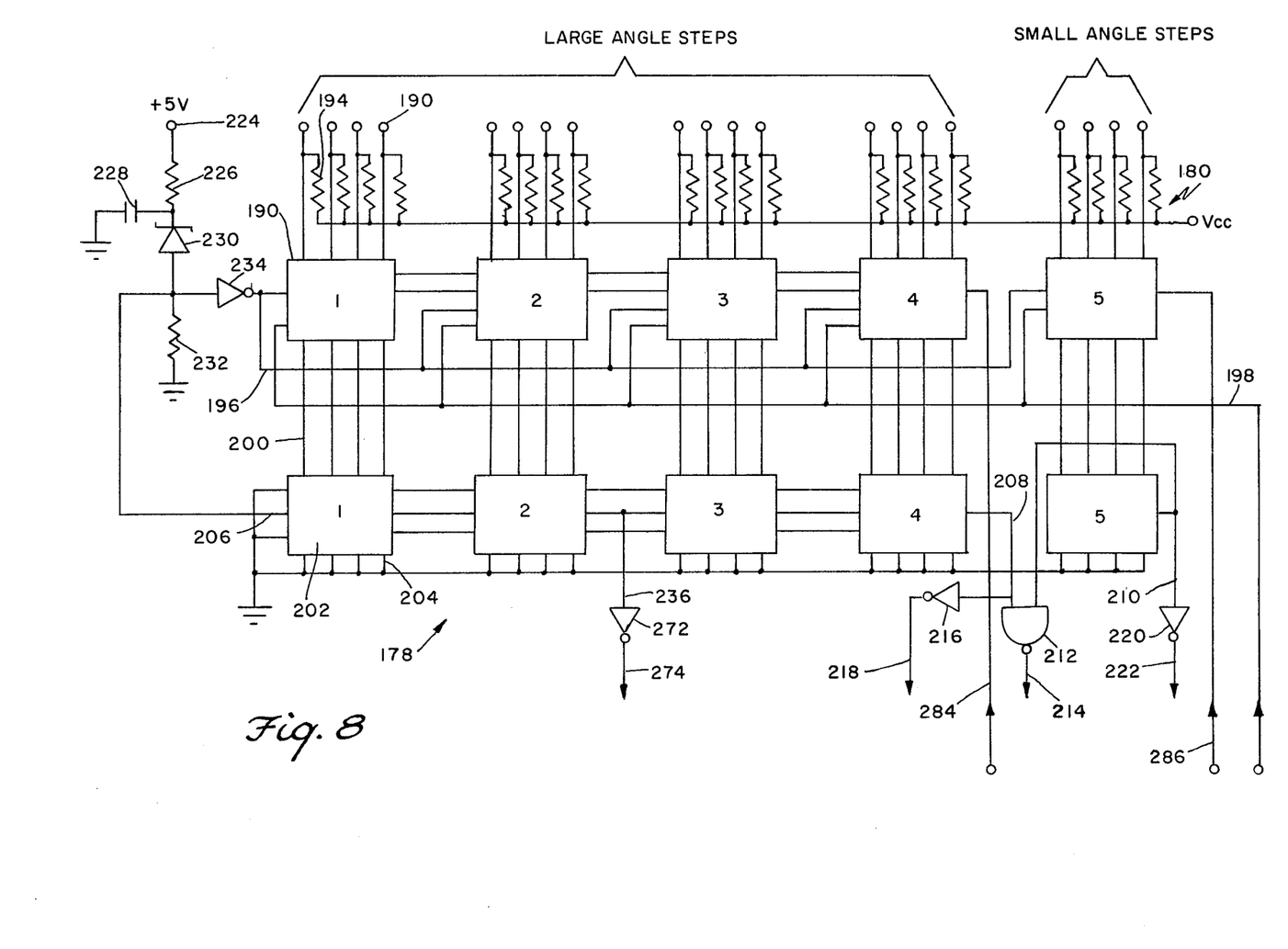
FIG. 8 is a circuit diagram of the counters depicted in FIG. 7.
Figure 9:
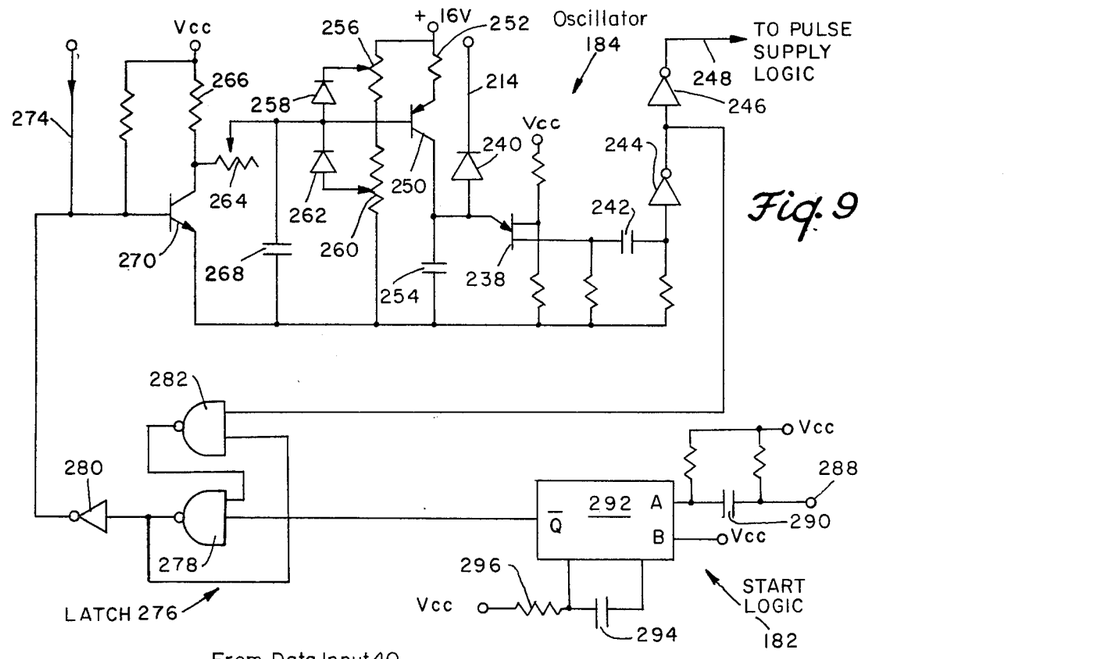
FIG. 9 is a circuit diagram of the oscillator and start control logic depicted in FIG. 7.
Figure 10:
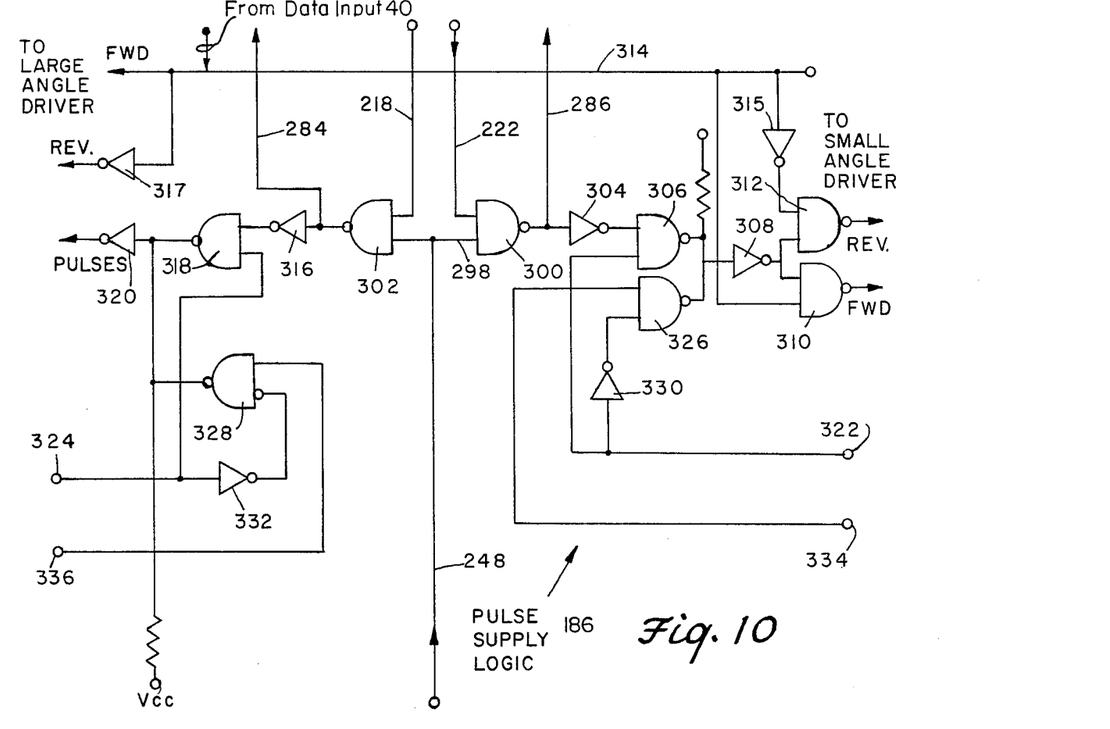
FIG. 10 is a circuit diagram of the pulse supply logic depicted in FIG. 7.

FIG. 8 shows the circuits for counters 178 and 180, FIG. 9 illustrates the oscillator 184 and start logic 182, and FIG. 10 shows the pulse supply logic 186. As shown in FIG. 8, each stage of the counters 178 and 180 includes a counter module 190 (operating in BCD) such as 74192 available from a number of sources, having a set of four inputs 191 respectively representing the number of steps in thousands, hundreds, tens and units for the large angle step motor 10 and in units for the small angle step motor 22. Each of the inputs is loaded by a resistor 194 connected to the supply voltage line. The clear and load terminals of each counter module are respectively connected to a clearing voltage line 196 and a start pulse line 198. The four counter modules of the 4-stage counter are interconnected in series with the up-count and down-count terminals of a preceding stage respectively connected to the carry and borrow terminals of a following stage, except for the carry and borrow terminals of the first stage and the up-count terminal of the fourth stage which are inactive. The four outputs of each counter module are connected to corresponding inputs 200 of an associated comparator module 202 such as 7485 also available from a number of sources. The other set of inputs 204 are all grounded. The comparator modules associated with the 4-stage counter 178 are interconnected in series through their output terminals on each side, except for the terminals on one side of the first and fourth comparator stages. Two of the side terminals of the first comparator stage are grounded and operating voltage is applied to the equality sensing terminal 206. The equality sensing terminals of the fourth stage comparator module and the comparator module of the single stage counter 180 are respectively connected to output signal lines 208 and 210. The output signals in lines 208 and 210 when simultaneously applied to the inputs of Nand gate 212 disable the oscillator circuit 184 through line 214 (see FIG. 9). An inverted signal from output line 208 is fed by inverter 216 to the pulse supply logic 186 (see FIG. 10) through line 218 for enabling the supply of pulses from the oscillator as will be described hereinafter in detail. Inverted signals from output line 210 are also fed by inverter 220 to the pulse supply logic 186 (see FIG. 10) through line 222.

When power is applied to the +5V voltage terminals 224 connected by resistor 226 to the operating voltage lines, through the action of capacitor 228 the operating voltage rises slowly to a threshold value above 4 volts, for example, sufficient to power the counters and other logic elements. When the threshold value is exceeded, zener diode 230 conducts sufficient current to pass resistor 232 to change the normally low state at the input of inverter 234 connected to the clearing signal line 196. The normal high maintained in the clearing signal line by resistor 232 thereby goes low to release the counter clearing action that otherwise occurs in each of the counter modules so that outputs therefrom may be fed to the inputs of the associated comparator modules. With the counters cleared, their outputs are low and the output signal lines 208 and 210 are high so that a low output is fed by Nand gate 212 to disable the oscillator. A start signal in line 198 to the load terminals of the counter modules 190 causes their outputs to reflect the input data applied to their input terminals. Assuming that the number of motor steps called for by the input data is more than zero, one or both of the output signal lines 208 and 210 go low to enable the oscillator through Nand gate 212. An interstage output signal line 236 is connected to the equality sensing terminal of the second stage comparator terminal for control of the oscillator when the count of the 4-stage counter 178 goes above a predetermined value such as "99", as will be explained hereafter.

The oscillator circuit 184 shown in FIG. 9, includes a unijunction transistor 238 having a control electrode to which the disable line 214 from Nand gate 212 is connected by diode 240. Output pulses from transistor 238 are fed through capacitor 242 and series connected inverters 244 and 246 to a pulse output line 248. A current control transistor 250 connected in series with resistor 252 to a 16 volt source, feeds current to a timing capacitor 254 that is periodically discharged through the control electrode of the unijunction transistor 238 to produce the output pulses. A low pulse rate limit is set at one value through potentiometer 256 connected to the 16 volt source, by the clamping action of diodes 258 connected between the base of transistor 250 and the potentiometer. The setting of potentiometer 260 connected in series with potentiometer 256 to ground, determines the high pulse rate limit imposed by the clamping action of diode 262 connected between the base of transistor 250 and potentiometer 260. The setting of potentiometer 264 connected in series with resistor 266 between the operating voltage source and the base of transistor 250 determines "acceleration rate" or rate at which current through transistor 250 increases by regulating the discharge of capacitor 268 through switching transistor 270 to correspondingly regulate the increase in pulse rate between the pulse rate limits. The collector of transistor 270 is normally driven high by the inverted output fed by inverter 272 from the second stage of the 4-stage counter 178 through line 274 until the count reaches "99" at which point the transistor 270 is driven low because of the low output state of inverter 272 connected to the base of transistor 270 to begin an increase in the output pulse rate of the oscillator from the low limit toward the high limit.

The oscillator is held at its low rate limit by a latch arrangement 276 as shown in FIG. 9 wherein Nand gate 278 receiving a low input from the start logic 182 causes the input to inverter 280 to go hi so as to drive the base of the transistor 270 lo. When the first positive going output pulse from the oscillator 184 is applied to inverter 244, the inverter output goes low to reset the latch 276 through its Nand gate 282 causing the base if the transistor 270 to go hi. The pulse rate of the oscillator then increases slowly until the high limit is reached. In this fashion the large angle step motor is permitted to accelerate so as not to lose steps. Similarly, the oscillator decelerates its pulse rate from the high limit toward the low rate limit during down counting operation of the counters when the count in the 4-stage decade counter is 99 or below.

As also shown in FIG. 9, a negative going pulse is applied to the start logic 182 from start terminal 288 through a capacitor 290 to trigger monostable 292 causing its $\overline{Q}$ output to go low for a period of time determined by capacitor 294 and resistor 296. This low output state is applied to the latch 276 as aforementioned to hold the oscillator at its low pulse rate and to load terminals of the counter modules 190 to enable operation of the counters.

As shown in FIG. 10, direction of rotation is determined by the signal on line 314 derived from data source 40. Positive going output pulses of the oscillator 184 are fed by inverter 246 to the pulse supply logic 186 (see FIG. 10) and is applied through line 298 to inputs of Nand gates 300 and 302 therein. If there is a count other than zero from the single stage counter 180, a high output from inverter 220 (see FIG. 8) is applied through line 222 to the other input of Nand gate 300 so that when a positive going pulse arrives from the oscillator, the output of Nand gate 300 goes low to feed a negative going pulse to the down count terminal of the single stage counter through line 286 (see FIG. 8), thereby reducing the count received from the data input source, toward zero. At the same time, the output of inverter 304 goes high enabling Nand Gate 306 which goes low to apply a positive going pulse through inverter 308 to the inputs of Nand gates 310 and 312. If direction control line 314 is high, Nand gate 310 is enabled to pass a negative going pulse driving the small angle driver step motor 22 in a forward direction. The Nand gate 312 is then disabled by the low applied thereto by inverter 315. When the down count of the single stage counter 180 reaches zero, its output in line 210 goes high and the output of inverter 220 goes low to disable Nand gate 300 preventing further pulses from being applied through line 286 to the counter.

Positive pulses in line 248 drive Nand gate 302 which passes negative going pulses assuming there is hi in the output of inverter 216 (see FIG. 8) in line 218. The negative going pulses at the output of Nand gate 302, applied through line 284 to the down count terminal, reduce the count acquired by the 4-stage counter from the data input and are passed as positive going pulses by inverter 316 to the Nand gate 318. Nand gate 318, if enabled, passes negative going pulses to inverter 320 from which positive going driving pulses are fed to the large angle driver 34. When the count down reaches 99, the pulse rate decelerates toward zero as aforementioned. When the count reaches zero, the counter output line 208 goes high to disable the Nand gate 302 and prevent further down count pulses from being applied through line 284. When both counters are at zero, Nand gate 212 disables the oscillator by applying a low to the control electrode of the unijunction transistor through diode 240.

A low logic gate in directional control line 314 enables gate 312 through inverter 315 to the small angle driver 36. At the same time, inverter 317 connected to the control line 314 applies a high logic state to the reverse control line 56 of the large angle driver 34.

The foregoing automatic operation is enabled by high applied to terminals 322 and 324 of the pulse supply logic in order to enable Nand gates 306 and 318. To apply pulses for driving either one of the step motors from external sources, the corresponding terminal 322 or 324 is brought to a low state to enable Nand gate 326 or 328 through inveryer 330 or 332. The external pulses are then applied at either terminal 334 or 336 to Nand gate 326 or 328.

In order to illustrate the manner in which the various circuits described in detail cooperate to operate both stepping motors 10 and 22, set forth below is a brief description of typical operation of the entire system. To begin, assume that the data input source 40 makes available to the digital control logic 38 signals corresponding to the desired position of the shaft 12 of motor 10. More particularly, as illustrated in FIG. 7, the input data is supplied to a four stage decade counter 178, in order to step motor 10, and data is also supplied to a single stage decade counter 180 to control the movement of motor 22. The start control logic 182 energizes the counters and the oscillator, and when the oscillator detects a non-zero count in the counters, it begins to supply pulses to the pulse supply logic 186. The frequency of these pulses increases from a preset relatively low level to a second preset high level, so long as the count in the four stage decade counter 178 exceeds the count of 99. As the oscillator outputs pulses to the pulse supply logic over conductor 248, gates 300 and 302 direct these pulses to both drivers 34 and 36, so long as they are enabled over conductors 218 and 222. These gates are enabled so long as their respective counters have not decremented the counts contained therein, to zero. As each pulse is provided to the drivers 34 and 36, the counts in each of the counters is decremented, via conductors 284 and 286. When the count in four stage decade counter 178 is reduced to 99 the oscillator changes frequency to slowly reach its lower preset level in response to the signal on conductor 274. When the counts in either of the counters 178 or 180 reach zero, the associated gate, either 300 or 302 is disabled, thereby preventing transmission of any further pulses to the driver associated with that counter. When both counters have been decremented to zero, e.g., when the respective motors reach the desired position, the oscillator is disabled, via conductor 214.

The pulses provided to the drivers 34 and 36 serve to sequentially energize the phase windings of the motor associated with the driver in a predetermined fashion so as to advance the motor shaft to its desired position.

I claim:

1. In combination with a first step motor having a rotor advanced through a relatively large step per unit of time toward a selected position and a plurality of phase windings energized in accordance with a predetermined switching format to effect unlimited stepped advancement of the rotor, interpolating means for advancing said rotor a distance equal to or less than one of said large steps, comprising a second step motor having a second rotor advanced a predetermined number of steps and a plurality of phase windings energized to effect said stepped advancement of the second rotor, means drivingly connecting the second rotor to the first motor for advancing the first rotor relatively small steps simultaneously with said advancement of the first rotor through said relatively large steps to the selected position, and digital logic means operatively connected to the phase windings of the motors for selecting the number of relatively large and small steps advanced by the rotors respectively to reach said selected position of the first rotor.

2. The combination of claim 1 wherein said digital logic means includes a source of driving pulses, a pair of drivers connected to said source of driving pulses for respectively transmitting energizing pulses to the phase windings of the motors, and slip-ring means coupling one of the drivers to the phase windings associated with the first step motor.

3. The combination of claim 2 wherein said source of driving pulses includes a pair of counters within which preselected counts are stored, oscillator means for generating said driving pulses, pulse control means transmitting the driving pulses from the oscillator means to the drivers and the counters for reducing the counts stored therein, means connected to the oscillator means for establishing lower and upper limits between which the frequency of said driving pulses is varied, and acceleration control means connecting one of the counters to the oscillator means for varying the frequency of the driving pulses when the count stored in said one of the counters is above a predetermined value.

4. The combination of claim 3 wherein said one of the counters includes a plurality of stages and interstage coupling means connecting said one of the counters to the oscillator means for maintaining the pulse rate constant at said lower limit below said predetermined value of the count stored in said one of the counter means.

5. The combination of claim 1 including accelerating means connecting to the digital logic means for varying the rate at which the rotors are advanced.

6. The combination of claim 1 wherein said source of driving pulses includes a pair of counters within which preselected counts are stored, oscillator means for generating said driving pulses, pulse control means transmitting the driving pulses from the oscillator means to the drivers and the counters for reducing the counts stored therein, means connected to the oscillator means for establishing lower and upper limits between which the frequency of said driving pulses is varied, and acceleration control means connecting one of the counters to the oscillator means for varying the frequency of the driving pulses when the count stored in said one of the counters is above a predetermined value.

7. The combination of claim 6 wherein said one of the counters includes a plurality of stages and interstage coupling means connecting said one of the counters to the oscillator means for maintaining the pulse rate constant at said lower limit below said predetermined value of the count stored in said one of the counter means.

8. Apparatus for indexing an output shaft to a desired predetermined angular position in response to a variable input signal representative of said angular position comprising
   a. a first stepping motor capable of unlimited rotation having a rotor for rotating said shaft a step at a time relative to a first motor housing means in response to a first digital signal determined by said variable input signal;
   b. a second stepping motor having a rotor operable a step at a time by a second digital signal also determined by said variable input signal, the angular rotation of said second motor from one step to the next being a predetermined sub-multiple of the angular rotation of said first stepping motor as it moves from one step to the next;
   c. and means responsive to rotation of the rotor of said second motor for rotating said housing means of said first stepping motor.

9. In combination, a pair of electric motors each having a rotor, means drivingly connecting the rotor element of one of the motors to the housing of the other of the motors, plural phase winding means operatively carried by each of said motor housings for simultaneous drive of the rotor elements through different angular distances, digital logic means connected to one of the plural phase winding means for stepped advancement of one of the rotor elements by angular increments of a predetermined distance, and slip-ring means operatively connecting the digital logic means to the other of the plural phase winding means for stepped advancement of the other of the rotor elements by angular increments larger than the predetermined angular increments through which said one of the rotor elements is advanced.

10. The combination of claim 9 including accelerating means connected to the digital logic means for varying the rate at which the rotors are advanced.

11. A step motor system comprising a first rotary step motor having a first housing including first plural field coils and a first rotor, a second rotary step motor having a second housing including second plural field coils and a second rotor, one of said step motors having a small angular progression per step of its rotor relative to its housing than has the other, means coupling said rotor of one of said motors mechanically in driving relation to the housing of the other of said motors, and digital logic means for stepping both said motors to a predetermined setting of said rotor of said second of said motors with respect to the housing of said first of said motors, wherein is provided slip rings rotating with said housing of said other of said motors, and wherein said digital logic means supplies stepping pulses to said field coils of said other of said motors through said slip rings whereby said rotors can both rotate through plural complete revolutions independently of one another.

12. The combination according to claim 11, wherein said digital logic means includes a separate up-down counter operatively associated with each of said motors, means for inserting desired counts into both of said counters to represent an ultimate rotation of said rotor of said second of said motors, and means for reducing the counts of said counters to zero in response to stepping pulses applied to both said field coils.

13. A motor system, including a first step motor having a first housing comprising plural field coils and a first rotor, a source of pulses, means connecting said source of pulses to said first field coils for effecting a step motion of said first rotor in either sense selectively in response to each of said pulses, a second step motor having a second housing comprising second plural field coils and a second rotor, logic means connecting said source of pulses to said second plural field coils for effecting a step motion of said second rotor in either sense selectively in response to each of said pulses, means coupling said first rotor to said second housing for rotation of said second housing in response to rotation of said first rotor, and logic means for controlling the number of pulses applied to each of said first and second field coils from said source of pulses to achieve a total predetermined rotary motion of said second rotor, and second rotor having an output shaft for coupling to a load, wherein is provided slip rings secured to said second housing for accepting said pulses applied to said second field coils, and means for conveying said pulses from said slip rings to said field coils of said second housing.

14. The combination according to claim 13, wherein said logic means provides for driving each of said rotors selectively in respect to its housing in the same and in opposite senses of rotation independently of one another.

15. The combination according to claim 13, wherein said means for controlling said number of pulses applied to each of said rotors includes separate counters for counting said pulses to control the numbers of said pulses applied to said field coils respectively.

16. The combination according to claim 13, wherein said pulses are applied to both said field coils concurrently.

17. The combination according to claim 15, wherein is included means for terminating pulsing of said source of pulses in response to said counters both achieving preset counts.

18. The combination according to claim 17, wherein said preset counts are zero counts.

19. The combination according to claim 18, wherein the relative angular rotations per step of said first rotor and said second rotor is ten to one for each of said pulses.

20. The combination according to claim 18, wherein said rotors respectively have angular rotations per step for each of said pulses in the ratio ten to one.

21. The combination according to claim 20, wherein said first rotor is directly connected to said second housing.

22. The combination according to claim 19, wherein said first motor is a 2000. step per revolution motor and wherein said second motor is a 200. step per revolution motor.

23. The combination according to claim 15, wherein either of said motors may step while the other motor is stationary.

24. The combination according to claim 11, wherein said rotary step motors are each reversible.

25. The combination according to claim 11, wherein said rotary motors are each reversible independently of the other.

26. The combination according to claim 12, wherein said rotary step motors are each reversible independently of the other.

27. A step motor system for stepping an output shaft in steps of $n/m$ degrees, including a first rotary reversible step motor having first field windings and a first rotor rotatable in steps of $n/m$ degrees per step, a second rotary reversible step motor having second field windings and a second rotor rotatable in steps of $n$ degrees per step, a source of drive pulses, logic means coupling said drive pulses to said field windings, said logic means including first logic circuitry including a first up-down counter for stepping said first rotor by a first up-down counter and further logic circuitry including a second up-down counter for stepping said second rotor by a second predetermined number of counts preset in said second up-down counter, and means responsive to each rotary step of said first rotor of $n/m$ degrees for imposing an equal rotary step on said second field windings, wherein is provided slip rings secured to said second field windings for rotation therewith, said slip rings being responsive to said logic means for coupling said drive pulses to said second field windings.

28. The combination according to claim 27, wherein $m$ is ten.

29. The combination according to claim 27, wherein $n$ is (360/200) and wherein $m$ is ten.

30. In a step motor system, a first motor having field windings and a step-wise rotatable element rotatable with respect to said field windings, a second step motor having field windings and a second element step-wise rotatable with respect to said first rotatable element, a first counter storing a first predetermined count, a second counter storing a second predetermined count, a source of pulses, means responsive to said pulses for stepping said first counter is zero count while stepping said first rotatable element with respect to its field windings in equal angular steps per pulse, means responsive to said pulses for stepping said second counter to zero count while stepping said second rotatable element with respect to its field windings in equal angular steps per pulse, wherein one of said angular steps is related to the other of said angular steps by an integral factor greater than unity, means coupling the rotor of said first motor to rotate the field windings of said second motor, and wherein is provided slip rings connected to said field windings of said second motor for conveying said pulses to said field windings of said second motor.

31. The apparatus of claim 8 wherein is included slip rings for coupling said digital signals to said first motor.

* * * * *